(12) United States Patent
Baud et al.

(10) Patent No.: US 9,421,598 B2
(45) Date of Patent: Aug. 23, 2016

(54) IMPACT DETECTION MARKER DEVICE AND A CORRESPONDING PROCESS METHOD

(75) Inventors: Laurent Albert Paul Baud, Lyons (FR); Stephane Noel Jacob, Genilac (FR)

(73) Assignee: Technomark, Saint Chamond (FR)

( * ) Notice: Subject to any disclaimer, the term of this patent is extended or adjusted under 35 U.S.C. 154(b) by 1576 days.

(21) Appl. No.: 12/302,622

(22) PCT Filed: May 31, 2006

(86) PCT No.: PCT/FR2006/001246
§ 371 (c)(1),
(2), (4) Date: Jun. 15, 2009

(87) PCT Pub. No.: WO2007/138173
PCT Pub. Date: Dec. 6, 2007

(65) Prior Publication Data
US 2009/0249850 A1    Oct. 8, 2009

(51) Int. Cl.
| | |
|---|---|
| *B21D 31/06* | (2006.01) |
| *B21D 31/00* | (2006.01) |
| *B44B 5/00* | (2006.01) |
| *G06K 1/12* | (2006.01) |

(52) U.S. Cl.
CPC ............. *B21D 31/06* (2013.01); *B21D 31/005* (2013.01); *B44B 5/0019* (2013.01); *B44B 5/0095* (2013.01); *G06K 1/12* (2013.01)

(58) Field of Classification Search
CPC .... B21D 22/18; B21D 31/005; B21D 17/02; B21D 22/00; B21D 22/27; B21D 31/06; B21D 53/00; G01B 3/008; G01B 21/30; G01B 5/28; B23Q 15/24

USPC ....... 72/75, 214, 220, 115, 83, 124, 125, 69, 72/112, 117; 33/554
See application file for complete search history.

(56) References Cited

U.S. PATENT DOCUMENTS

| | | | |
|---|---|---|---|
| 3,779,291 A * | 12/1973 | Yeo ................................. 72/112 |
| 4,142,238 A | 2/1979 | Brandt et al. |
| 4,511,977 A | 4/1985 | Schuettpelz |
| 6,598,684 B2 * | 7/2003 | Watanabe ........... B25B 23/1405 173/176 |
| 6,604,295 B2 * | 8/2003 | Nishimura et al. ............. 33/554 |
| 8,033,151 B2 * | 10/2011 | Castle et al. ..................... 72/75 |
| 2002/0114653 A1 | 8/2002 | Gatta |
| 2005/0086816 A1 * | 4/2005 | Siegel ............................ 72/76 |
| 2006/0150710 A1 * | 7/2006 | Moyse et al. ...................... 73/7 |

FOREIGN PATENT DOCUMENTS

| | | |
|---|---|---|
| DE | 2827711 A1 | 1/1979 |
| DE | 29518137 U1 | 11/1996 |
| FR | 2801238 A1 | 5/2001 |
| WO | 2007138173 R | 11/2007 |

* cited by examiner

*Primary Examiner* — Shelley Self
*Assistant Examiner* — Pradeep C Battula
(74) *Attorney, Agent, or Firm* — Millen, White, Zelano & Branigan, P.C.

(57) ABSTRACT

The invention relates to a device (1) for marking parts by percussion including a mobile punch (3) adapted to strike a part (2) to be marked so as to deform it, the device being characterized in that it includes impact detection means capable of detecting impact of the punch (3) on said part (2) to be marked and processor means functionally connected to the impact detection means to evaluate the time between the impact time and a predetermined origin time before the impact time.

21 Claims, 3 Drawing Sheets

IMPACT DETECTION MARKER DEVICE AND A CORRESPONDING PROCESS METHOD

TECHNICAL FIELD

The technical field of the present invention is that of devices and machines for marking diverse parts of a generally industrial kind, said devices being able to produce on the surface of the part a series of indelible symbols or alphanumeric signs, in particular by indented deformation of the material by micropercussion.

The present invention relates to a percussion device for marking parts including a mobile punch adapted to strike a part to be marked in such a manner as to deform the part.

The present invention also relates to a percussion method of marking parts in which a mobile punch strikes a part to be marked in such a manner as to deform the part.

Said invention finally relates to a computer program including computer program code means adapted to execute the steps of a marking method when said program is executed on a computer.

PRIOR ART

There are many requirements for engraving or marking parts in many industrial sectors, in particular for managing materials flows and for traceability.

These requirements can vary in particular in terms of the dimensions, the shapes and the numbers of characters and/or symbols to be marked on the parts.

To address these requirements, it is known in particular to use micropercussion marker devices that utilize a vibrating point, also referred to as a "punch" or "stylus", which strikes the surface of the part in order to create a succession of indented points therein by local plastic deformation of the material.

Thus by increasing the number of impacts and moving the stylus relative to the surface of the part, it is possible to trace out indelible patterns or characters one point at a time.

Such micropercussion marker devices generally include a marker head housing a mobile punch guided in translation. Said marker heads are commonly adapted to be moved along two orthogonal motor drive axes, preferably substantially parallel to the surface of the part to be marked, the punch being adapted to be moved along an axis normal to that plane.

The marker head usually also incorporates propulsion means that propel the punch towards the part to be marked so that its tip collides with the surface of the part. It is well known for the propulsion means to take the form of an electromagnet adapted to move a mobile core forming a slug that drives the stylus to impart to it sufficient kinetic energy to deform the surface of the part locally as an effect of the impact.

Known micropercussion marker devices suffer from non-negligible drawbacks, however.

First of all, existing micropercussion marker devices are particularly sensitive to any curvature of the parts to be marked, surface irregularities thereof, or the position of said parts relative to the marker head. The kinetic energy of the stylus at the moment of impact, and consequently the depth, dimensions, and legibility of the point produced by said impact, are closely dependent on the stroke of the stylus, i.e. on the distance, referred to as the "working distance", between the part and the marker head.

This strong dependence of the quality of the marking on the working distance often reduces the reproducibility of the marking process, in particular between successive impact points intended to form the same character.

With irregular or convexly curved parts in particular, the irregularity of the impact points is liable to result in markings that are incomplete, of poor quality or even illegible, which can prove unacceptable for precision markings intended to be read by automatic optical reader systems using character-recognition or shape-recognition video cameras. The quality of the marking is also critical if it is intended to produce a 2D matrix code for identifying parts and/or storing information associated with them, such as the Data Matrix® code.

Then, because users generally adjust prior art marker devices empirically, somewhat approximately, and relatively crudely relative to an average result obtained on a test part, it frequently happens that the power generated to propel the stylus is very different from that which would be just necessary and sufficient to achieve the required result. If said power is insufficient, there is a risk of the marking being insufficiently pronounced, or even non-existent if the stylus does not even have the force to reach the part.

The natural reaction of the operator is often to apply a much greater propulsion power than is required in order to ensure sufficient percussive force. This wastes energy, which in particular reduces the battery life of portable marking equipment limited by the capacity of its battery. Moreover, in the event of excessively violent percussion by the stylus, the part may be damaged or even perforated. Finally, repeated impacts that are unnecessarily powerful tend to reduce the longevity of the stylus through premature fatigue thereof.

SUMMARY OF THE INVENTION

Objects of the invention are therefore to remedy the above drawbacks and to propose a new device for marking parts by percussion that can produce marking points reliably, reproducibly, and independently of the working distance, of the shape of the parts to be marked, and of the regularity of the surfaces of the parts.

Another object of the invention is to propose a marker device enabling fine and precise control of the stylus.

Another object of the invention is to propose a marker device of particularly simple design using a minimum number of particularly inexpensive parts.

Another object of the invention is to propose a marker device that is particularly easy for the operator to use.

Another object of the invention is to propose a new marker device that makes the marking process reliable and safe and facilitates maintenance.

Another object of the invention is to propose a new method of marking parts by percussion that is particularly reliable, reproducible, and robust in the face of variations in the working distance, the shapes of the parts to be marked or the regularity of their surfaces.

Another object of the invention is to propose a marking method providing fine and accurate control of the stylus in order to optimize marking quality.

Another object of the invention is to propose a marking method that is particularly fast and economical of energy.

Another object of the invention is to propose a marker device that is capable of automatically correcting any drift without disturbing the visual appearance of the marking.

Finally, another object of the invention is to propose a computer program for simplifying the marking of parts and making it reliable.

The objects of the invention are achieved by a device for marking parts by percussion including a mobile punch adapted to strike a part to be marked so as to deform it, the device being characterized in that it includes impact detection means capable of detecting impact of the punch on said part to be marked and processor means functionally connected to the detection means to evaluate the time between the impact time and a predetermined origin time before the impact time.

The objects of the invention are also achieved by a method of marking parts by percussion in which a mobile punch strikes a part to be marked in such a manner as to deform the part, the method being characterized in that it includes an impact detection step (a) in which impact of the punch on said part to be marked is detected, and a processing step (b) in which, in connection with the step (a), the time between the impact time $t_i$ and a predetermined origin time $t_0$ before the impact time $t_i$ is evaluated.

Finally, the objects of the invention are achieved by a computer program comprising computer program code means adapted to execute the steps of a method of the invention when said program is executed on a computer.

BRIEF DESCRIPTION OF THE DRAWINGS

Other features and advantages of the invention emerge in more detail on reading the following description, and with the aid of the appended drawings, which are provided by way of non-limiting illustration only, in which drawings.

PREFERRED EMBODIMENT OF THE INVENTION

Figure 1:
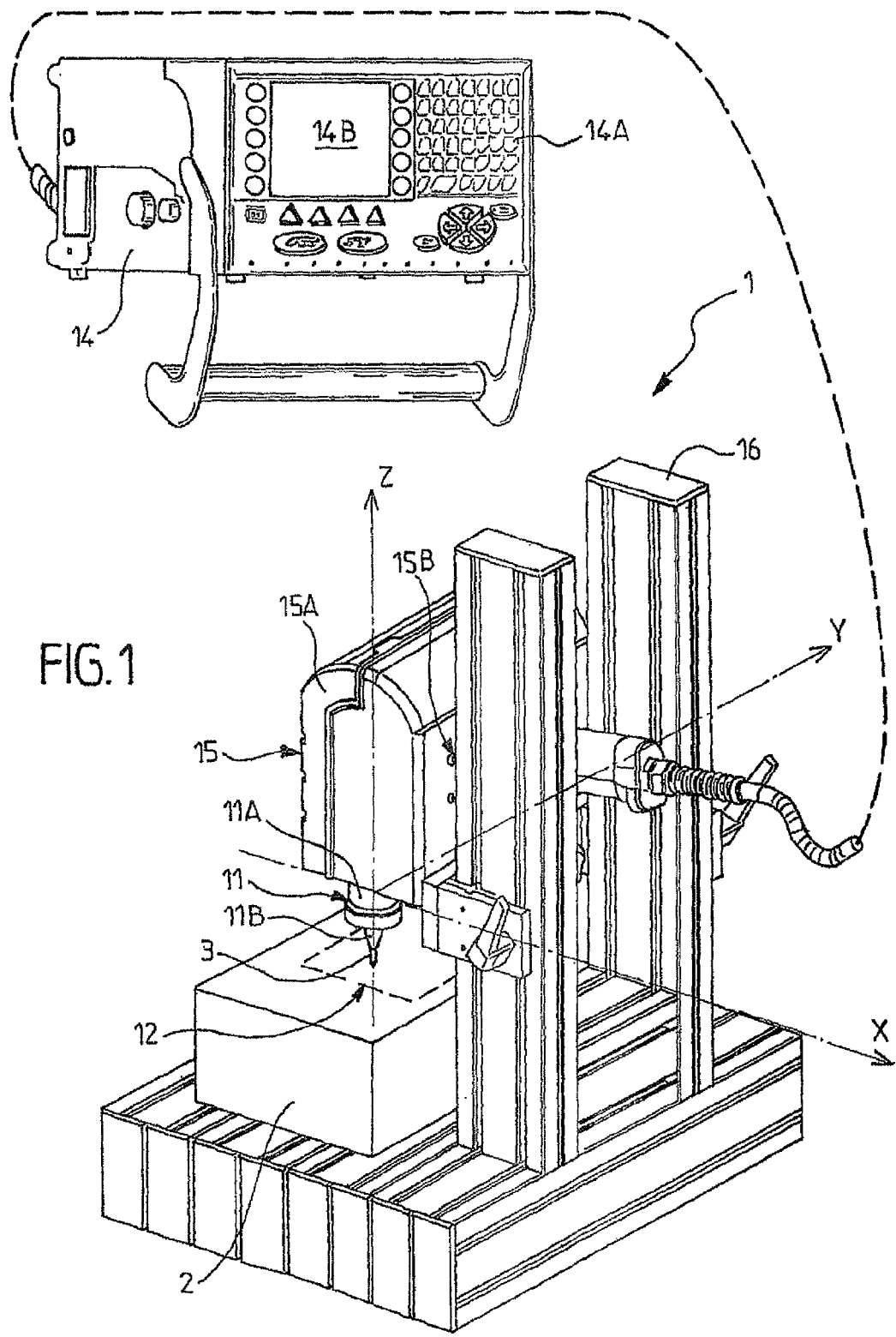
FIG. 1 is a general perspective view of a percussion marker device of the invention.

The device 1 of the invention for marking parts is intended to mark indelibly a part 2 to be marked, in particular a mechanical part, by percussion.

The marker device 1 of the invention preferably produces one or more impact points by indented deformation of the surface of the part 2 to be marked.

Thus the device 1 is in particular adapted to produce alphanumeric characters, logos, ornamental patterns or identification symbols one point at a time. The device 1 of the invention is advantageously specifically adapted to produce Data Matrix® 2D matrix code markings.

To this end, the marker device 1 of the invention includes a mobile punch 3 adapted to strike said part 2 in such a manner as to deform the part and, better still, to deform the surface of said part 2 locally.

According to an important feature of the invention, said device 1 includes impact detection means 4 capable of detecting impact of the punch 3 on the part 2.

To be more precise, the impact detection means 4 provide information about the existence of an actual impact between the punch 3 and the part 2, i.e. an indication that the punch has come into physical contact with the part.

The impact detection means 4 of the invention advantageously detect impact of the mobile punch 3 on the part 2, whether said part 2 is electrically conductive or not.

According to another important feature of the invention, the device 1 also includes processor means 5 functionally connected to the detection means 4 to evaluate the time period between the impact time $t_i$ and a predetermined origin time $t_0$ before the impact time $t_i$.

In other words, the processor means 5 are able to mark in a freely chosen time frame of reference any impact of the punch 3 on the part 2, i.e. when an impact has occurred and been detected by the detection means 4, to indicate the moment at which that event occurs.

Said time period can be evaluated in particular by a relative time measurement triggered at the origin time $t_0$ and stopped at the impact time $t_i$ or by absolute time stamping of these events using an internal clock of the device 1.

The processor means 5 are preferably also adapted to evaluate the distance traveled by the punch 3 between a first position that it occupies substantially at the impact time $t_i$ and a second position that it occupied at an origin time $t_0$ before the impact time $t_i$.

In particular, and independently of the above, the present invention can also relate to a marker device 1 for marking a part 2 by percussion including impact detection means 4 adapted to detect impact of the punch 3 on said part 2 and processor means 5 functionally connected to the impact detection means 4 to evaluate the distance traveled by the punch 3 between a first position that it occupies substantially at the impact time $t_i$ and a second position that it occupied at an origin time $t_0$ before the time impact $t_i$.

Below, the first position occupied substantially at the impact time $t_i$ is referred to as the "contact position" and the position occupied at the origin time $t_0$ before the impact time $t_i$ is referred to as the "origin position". The punch is preferably adapted to be driven with an oscillatory movement during which it passes alternately between an origin position corresponding to the "high point" of its stroke, and in which said punch is far away from the part 2, and a contact position corresponding to the "low point" of its stroke, in which it touches the part.

However, the origin and/or contact positions do not necessarily constitute abutment or equilibrium positions of the mobile punch 3.

The device 1 of the invention also includes propulsion means 6 adapted to impart movement to the punch 3 when activated.

In a preferred embodiment, the processor means 5 can evaluate the time interval Δt, referred to as the "flight time", that elapses between the time $t_a$ of activation of said propulsion means 6 and the time $t_i$ at which the punch 3 collides with the part 2. In other words, the origin time $t_0$ preferably corresponds to the activation time $t_a$ of the propulsion means 6.

It is particularly preferable for the propulsion means 6 to include an electromagnet 7, for example of the solenoid type, adapted to impart movement to a mobile core 8 that is drivingly connected to the punch 3.

The mobile core 8 is preferably formed by a substantially cylindrical slug 9 that is flexibly or rigidly connected to the punch 3 and advantageously increases its inertia and consequently the kinetic energy that it is possible to impart to it. Using a slug has the advantage of authorizing the use of fine punches of small dimensions, low mass, and simple geometry, which punches are therefore relatively compact and relatively inexpensive.

Figure 2:
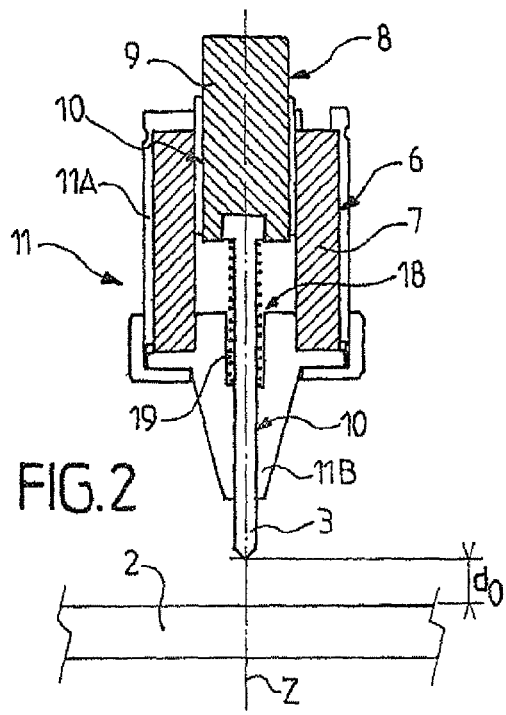
FIG. 2 is a section view of an embodiment of a marker head that can be used in a marker device of the invention.
Figure 3:
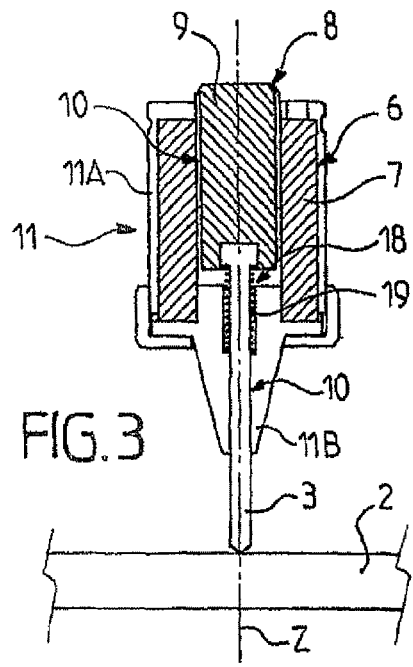
FIG. 3 is a section view of the marker head of FIG. 2 when the mobile punch strikes the part to be marked.
Figure 4:
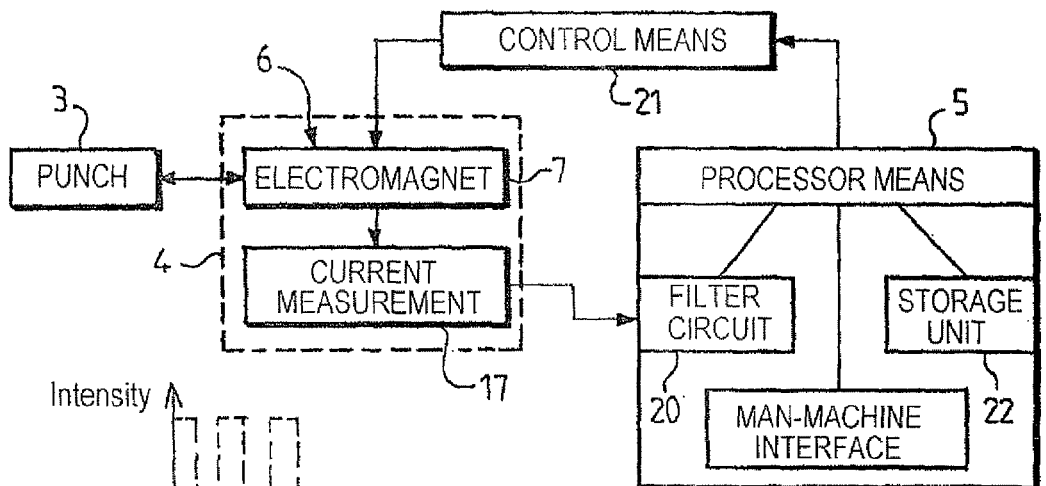
FIG. 4 is a diagram of a different functional organization of various components of a marker device of the invention.

In a preferred embodiment shown in particular in FIGS. 1 to 3, the punch 3 is mobile in translation along an axis Z and preferably guided by translation guide means 10 in a marker head 11.

The marker head 11 can advantageously have circular geometry, for example with a hollow cylindrical body 11A including a housing adapted to receive the solenoid 7 and extended by a frustoconical end-piece 11B forming a nozzle oriented towards the part 2 from which the punch 3 can protrude.

Said marker head 11 is preferably mobile in translation along orthogonal axes X and Y that form a plane (X, Y) substantially perpendicular to the translation axis Z of the punch.

The stroke of the marker head 11 along the axes X and Y advantageously defines, in a plane parallel to the plane (X, Y), a marking window 12 formed by the region of space accessible to the punch 3.

The device 1 is preferably positioned relative to the part 2 so that the plane (X, Y) is substantially parallel to the surface of said part 2 if said surface is substantially plane or so that the marking window parallel to the plane (X, Y) is substantially tangential to the surface of said part 2 if said surface is convexly curved.

The positioning and movement of the marker head 11 can be motor-driven and controlled by a control unit 14, preferably a remote control unit, that acts in particular, between two successive impacts, to move the punch 3 in a plane substantially parallel or tangential to the surface of the part 2 at different points inside the marking window 12.

In a different embodiment, the marker head 11 can also be mobile and servo-controlled along a third axis that is preferably substantially parallel to the translation axis Z of the punch 3.

The control unit 14 is preferably provided with a man-machine interface including an alphanumeric keyboard 14A and a display screen 14B, for example, enabling the user to program and/or control the device 1.

The marker head 11 and its drive means can advantageously be integrated to form a marker subsystem 15 separate from the control unit 14. Said marker subsystem 15 can in particular have a casing 15A and/or further fastener means 15B enabling said subsystem to be integrated into a production line, enabling said subsystem to be mounted on a column 16 of variable height to form a marker station as shown in FIG. 1, or enabling accessories to be added to said subsystem, for example a handle for using it as a portable marker gun.

In a different embodiment, spacer means can be inserted between the part 2 and the marker subsystem 15 to maintain a predetermined minimum distance between the marker head 11 and the part 2. The spacer means can in particular take the form of an apertured frame, possibly of variable height.

By design, the stroke of the punch 3 is preferably between first and second extreme positions defined, for example, by abutment or retaining members 18 such as shoulders functionally associated with the translation guide means 10 in order to limit movement of said punch 3 relative to the marker head 11.

Thus the device 1 of the invention can, by means of control of the marker head 11 and/or by means of use of a column 16, advantageously employ means for adjusting the distance between the part 2 and one or both of said first and second extreme positions.

In a different and particularly preferred embodiment, the processor means 5 can be integrated into the control unit 14 and can control the position of the marker head 11. In particular, the processor means 5 can be used to adjust the working distance by controlling the position of the marker head 11 relative to the part 2 along an axis substantially parallel to the axis Z.

The punch 3 preferably has a rest position between the first and second extreme positions, towards which rest position it is spontaneously urged, for example by spring type resilient return means 19, as shown in FIG. 2. This rest position can advantageously correspond to an equilibrium position in which, if the propulsion means are not activated, the punch 3 is retracted into the marker head 11, i.e. is withdrawn relative to the part 2. Thus the punch 3 is preferably adapted to be moved away from said rest position when it is propelled by the propulsion means 6.

It is particularly preferable for said rest position to constitute the origin position of the punch 3, which punch is substantially in this position just before the time $t_a$ at which the propulsion means 6 are activated, and in which position it has virtually zero speed relative to the marker head 11.

The distance $d_0$ between the tip of the punch 3 and the part 2 when said punch 3 is in its rest position can then advantageously be considered to represent the actual working distance of the device 1.

According to a preferred feature of the invention, the mobile core 8 and the punch 3 are such that impact of the punch 3 on the part 2 disturbs the movement of the mobile core 8 and this disturbance to the movement of the mobile core 8 generates a back electro-motive force (back-emf) in the electromagnet. To be more precise, the punch 3 stopping when it collides with the part 2 preferably stops the movement of the mobile core 8 suddenly, the stopping of the mobile core generating a back-emf in the electromagnet 7.

It is particularly advantageous for the electromagnet 7 that propels the punch 3 to form an inductive sensor responsive to the electrical disturbances P caused by sudden stopping of said punch 3. In other words, in a preferred embodiment that could be considered to be a separate invention, the electromagnetic actuator of the punch 3 also constitutes part of the impact detection means 4 of the percussion marker device. This constructive feature considerably simplifies the device 1 and makes it more compact.

The impact detection means 4 preferably include means 17 for measuring the electrical current flowing in the electromagnet 7.

The processor means 5 are preferably integrated into the control unit 14 and preferably include an electrical filter circuit 20 connected to said current measuring means 17 in order to isolate the disturbance P from the electrical current flowing in the electromagnet 7, such as reversing of said current, which is caused by the back-emf generated by the impact of the punch 3 on the part 2. To this end the filter circuit 20 preferably includes a second order filter.

Figure 5:
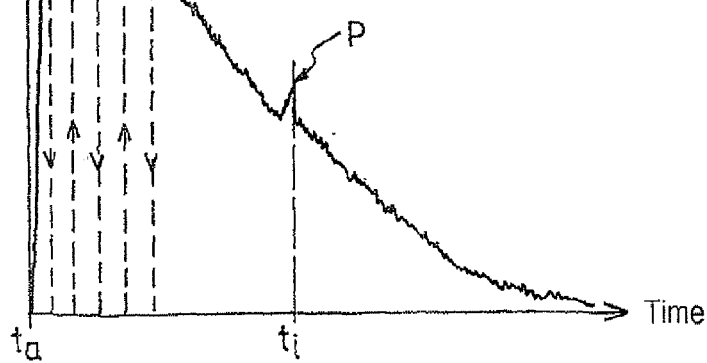
FIG. 5 is a graph as a function of time of the electrical current flowing in electromagnetic propulsion means for the punch that can be used in a device of the invention.

The processor means are therefore advantageously able to distinguish the effects on the current in the electromagnet 7 of a very weak induced back-emf, in particular relative to electronic noise and residual current, which current is progressively extinguished after activation of the propulsion means 6 ceases, as shown in FIG. 5.

It is particularly advantageous for the means 17 for measuring the electrical current flowing in the electromagnet 7 also to enable the processor means 5 to monitor the energization of said electromagnet 7 and, where appropriate, to diagnose the status of the induction circuit by detecting short-circuiting or opening of said circuit.

In a preferred embodiment, the device 1 of the invention includes control means 21 adapted to apply a current pulse to the electromagnet 7, said control means 21 including parameter setting elements for adjusting the intensity and/or duration of said pulse. As shown diagrammatically in dashed line in FIG. 5, it is particularly preferable for the control means 21 to be to chop a DC voltage significantly higher than the nominal voltage of the electromagnet 7 in order to control the electrical current that flows in the electromagnet 7. It is therefore possible in particular to adjust the intensity of the pulse between a substantially zero value and predetermined maximum value $I_{max}$, the corresponding parameter setting element being able, for example, to prompt the user to choose a percentage of said value $I_{max}$. In other words, the control means 21 are connected to the propulsion means 6 and adapted to activate them whilst offering the possibility of defining the nature and the power of the activation.

In a preferred embodiment, the control means 21 are connected to the processor means 5 so that the processor means can control the electromagnet 7. The processor means 5 are therefore able to set the parameters of, activate, and monitor activation of the propulsion means 6.

The processor means 5 are more particularly adapted to trigger a calibration impact, i.e. to bring about excitation of the electromagnet 7 with the aid of a "calibrated" current pulse of predetermined intensity and duration.

The intensity and duration of said calibrated pulse corresponding to a calibration impact are preferably defined empirically so that firstly the electrical power supplied is sufficient to enable the punch 3 to travel substantially the whole of the stroke allowed by the translation guidance means 10 and/or the abutment or retaining members 18 in the marker head 11, and so that secondly the duration of said pulse is sufficiently short to prevent the excitation current lasting up to, or even beyond, impact of the punch 3 on the part 2, and therefore not to mask the disturbance P induced by the back-emf at the moment of impact. In other words, the calibrated pulse must produce both an actual impact, the punch 3 receiving sufficient energy to reach the part (preferably from its rest position), and also actual detection of the impact, regardless of the working distance between the marker head 11, and thus the punch 3, and the part 2 (within the limit of the maximum stroke of the punch, of course).

The actual minimum working distance of the device 1 is preferably greater than or equal to 0.5 millimeters (mm) and particularly preferably is greater than 0.8 mm.

According to a preferred feature of the invention, the processor means 5 can include means (not shown) for correlating the flight time $\Delta t$ and the distance traveled by the punch. To be more precise, the correlation means preferably determine the length of the stroke effected by the punch between the activation time $t_a$ of the propulsion means 6 and the time $t_i$ at which the punch collides with the part 2. Thus it is possible, knowing the flight time, to obtain in particular an accurate evaluation of the actual working distance.

In practice, the correlation means can be based on one or more mathematical models and/or on charts establishing a relationship between the flight time $\Delta t$ and the distance traveled by the punch 3. Such charts can advantageously be established by a succession of experiments measuring, for different known working distances, the time that elapses between excitation of the electromagnet 7 by a calibrated pulse and the impact of said punch 3 on the part 2.

In a particularly preferred embodiment, the processor means 5 are adapted to evaluate the kinetic energy of the punch 3 at the moment of impact. This energy can be evaluated in particular by applying mathematical formulae derived from dynamics, knowing the masses of the punch 3 and the slug 9, the flight time $\Delta t$ of the punch, and the distance that the punch has traveled up to the impact.

This evaluation aims to determine the kinetic energy required by the punch 3 when it is caused to move by the propulsion means 6, which depends on the speed of said punch 3 just before it strikes the part 2. It is this kinetic energy that is converted at least partly into deformation energy to cause the material of the part 2 to flow under the tip of the punch 3 from the impact time $t_i$.

In a preferred embodiment, the processor means 5 further include a data storage unit 22 enabling said processor means 5 to store a record of the data it has evaluated, measured, processed, and/or transferred on previous impacts. This record can naturally be established over one or more time periods and/or as a function of a number of impacts effected, possibly defined by the user.

Thus the processor means 5 are able to store in particular the parameter settings of the control means 21, the measurements of the current flowing through the electromagnet 7, and/or the results of timing or evaluating the working distance or the kinetic energy following one or more impacts already effected.

The processor means 5 are preferably adapted to apply statistical processing to some or all of the data of this record and, via the result(s) of said statistical processing, to compare that data and the data from a new impact, in order to warn the user if this comparison shows a large difference. In other words, the processor means 5 can extrapolate one or more scenarios corresponding to normal use of the device 1 and report a break in continuity relative to those scenarios. This can advantageously enable the detection of an anomaly linked to a failure of the device 1 of the invention or an operating error by the user, for example if the user makes a mistake when programming the setpoint of the excitation pulse or positions the marker head at a working distance incompatible with correct operation of the device 1. In this way the processor means 5 make the operation of the device 1 safer.

In a preferred embodiment of the invention the processor means 5 include training means (not shown) that enable the user to store, for example in the data storage unit 22, one or more particular adjustments corresponding to a kinetic energy of the punch 3 that yields a marking deemed visually acceptable, said processor means 5 then being able to adjust the parameter setting elements for the excitation pulse of the electromagnet 7 to reproduce that kinetic energy on later impacts.

In other words, on the basis on an empirical adjustment established by the operator on the basis of one or more experiments, the device 1 of the invention is then able to control marking according to a constant impact energy criterion. This "constant energy" mode of operation is particularly beneficial from the point of view of marking reproducibility and consistency, especially if the working distance is liable to vary as a function of the point in question in the marking window 12 because of the geometry and/or the position of said part relative to the marker head 11.

Moreover, as described in detail below, the processor means 5 can be adapted to alternate "blind" marking impacts, i.e. impacts not giving rise to systematic detection of impact, or giving rise to a limited or even no processing after impact detection, with calibration impacts to recalibrate the device 1 of the invention regularly and automatically during marking. For example, it can be envisaged to calibrate the device as soon as the marker head 11 has traveled a predetermined distance in the (X, Y) plane in the marking window 12. This can limit the effect on marking a part whose surface is inclined relative to the (X, Y) plane of the progressive increase in the working distance as the marker head 11 moves.

In one embodiment of the invention, the processor means 5 can also be adapted to reduce the cycle time necessary for marking a character by triggering the activation of the propulsion means 6 very quickly after the impact detection means 4 have detected the actual impact of the punch 3 on the part 2. Thus, in this "optimum speed" mode of operation, the processor means can adapt control of the punch 3 to its actual behavior substantially in real time.

In other words, the device 1 of the invention can circumvent the constraint linked to applying a latency time to each percussion cycle after each activation of the propulsion means 6, where such a fixed and particularly long arbitrary latency time would otherwise need to be applied in order to cover the maximum time that the punch 3 requires to reach the part 2 and then to be reset, i.e. to regain a position in which it can again be propelled normally by the propulsion means 6.

For example, it is possible to shorten the delay between successive impacts when the working distance is short and conversely to increase the delay between successive impacts when the working distance increases.

Moreover, the processor means 5 can include diagnostic means adapted to verify whether an actual impact of the punch 3 on the part 2 is detected in a predetermined time period starting from the activation time $t_a$ of the propulsion means 6 and to report an anomaly if no impact has been detected at the end of said time period.

In particular, detection of this type of malfunction can advantageously indicate quickly that the punch is broken or that there is no part to be marked in front of the marker head 11.

The device 1 of the invention can therefore have one or more active assistance functions, in particular monitoring errors and recommending parameter settings for the attention of the user.

Moreover, to fulfill some or all of their functions, the processor means 5 are preferably computerized. To this end it is noteworthy that the information medium of the processor means 5, both hardware and software, can advantageously be integrated in the control unit 14 and/or in a personal computer (PC) separate from said control unit.

An example of the operation of a preferred embodiment of a device 1 of the invention is described below.

The user of the device 1 can first configure said device according to the nature and the conditions of the marking to be effected. In particular, the user can attach the marker subsystem 15 to a stationary production line to process parts in series or can fasten a handle to it to convert it to a portable marker gun usable manually on large parts.

Using the man-machine interface of the control unit 14, the user can then choose to use a program drawn up previously in which there are stored the various parameters of a marking to be reproduced identically on a part 2 of known type, to set up the parameters of a new marking manually, or to effect a machine adjustment.

A machine adjustment is particularly indicated when it is necessary to carry out marking experiments to adapt the process to a new series of mechanical parts. If the operator decides to effect a machine adjustment, it is possible to carry out one or more experimental impacts with a specified arbitrary duration and intensity of the pulses delivered to the electromagnet 6 and/or the working distance, where appropriate.

After one or more successive experiments during which a series of impact points is produced, each impact point corresponding to particular pulse and/or working distance conditions, the operator selects the series of impacts that appear to give the best visual appearance and, using the training means, indicates to the processor means 5 that they have to store the corresponding parameters in the storage unit 22.

If the assistance function is activated, the operator can then select an appropriate mode of operation. Non-limiting examples of modes of operation of the device 1 of the invention that can be used are described below.

In a first or "constant energy" mode of operation, the processor means 5 can periodically verify the actual working distance and adjust the parameter settings of the pulse to impart to the punch 3 substantially the same kinetic energy on each impact.

In a second or "maximum force" mode of operation, the processor means 5 can periodically verify the actual working distance and then adjust the parameter settings of the pulse to obtain, given the available distance, the maximum kinetic energy of the punch 3 at the moment of impact.

In a third or "optimum speed" mode of operation, the processor means 5 can adapt the frequency at which excitation pulses are delivered to the electromagnet as a function of the distance that the punch 3 must travel to reach the part and be reset, in order to reduce the non-productive time of the marking cycle and obtain a maximum speed of execution of said marking.

The operator is nevertheless free to deactivate one or more assistance functions and to carry out a series of impacts in accordance with parameters freely chosen by the operator.

When the operator triggers marking, the processor means 5 apply to the control means 21 the chosen duration and intensity parameters and commands them to activate the propulsion means 6, i.e. to deliver a current pulse to the electromagnet 7.

When the electromagnet 7 is excited by the pulse, it generates a magnetic field that acts on the slug 9, applying a force thereto that accelerates it. The moving slug 9 drives the punch 3 until its tip strikes the surface of the part 2 or until said punch 3 reaches the limit of its stroke within the marker head 11.

During a calibration impact carried out periodically, and preferably and more generally during normal operation of the device 1, the duration of the pulse is less than the flight time $\Delta t$, i.e. the excitation of the electromagnet 7 is interrupted before the punch 3 strikes the part 2. Because of the inductive nature of the electromagnet 7, the electric current through it is not interrupted suddenly, but decreases progressively after interruption of the excitation, constituting a residual current.

When the punch 3 collides with the part 2, the movement of the slug 9, i.e. of the mobile core 8, stops suddenly, which by induction generates a back-emf in the electromagnet 7, thereby creating a disturbance P to the residual electric current that was decreasing, such as reversing it.

By means of the means 17 for measuring said current, the impact detection means 4 sense this disturbance.

By filtering the measured signal, the processor means 5 isolate the peak that reveals this disturbance P relative to the normal residual current decrease curve and time stamps this event.

If no impact is detected during a predetermined time period after activation of the propulsion means, the processor means 5 generate a warning signal that warns the user of an anomaly.

If an impact is detected by the impact detection means 4, the processor means 5 determine the flight time Δt that has elapsed between the time $t_a$ of application of the excitation pulse to the electromagnet 7 and the impact time $t_i$.

The processor means 5 then determine the distance traveled by the punch during the flight time Δt on the basis of the data supplied by one or more charts or mathematical models.

From measured data providing information on the actual working distance and the flight time of the punch 3, the processor means 5 can evaluate the kinetic energy of the punch at the moment of impact, knowing the mass in motion at the time of percussion.

If the first or "constant energy" mode of operation has been selected, the processor means 5 can then compare this evaluation of the kinetic energy to the record of previous impacts or to the setpoint stored by the user, in order to verify the activation parameter settings of the propulsion means 6, and if necessary to adjust them accordingly.

If necessary, by comparing the setpoint parameter settings resulting from the machine adjustment with the evaluations of the flight time, the working distance, and/or the kinetic energy at the moment of impact, the processor means 5 can also suggest to the operator optimized parameter settings for the device 1, or even correct automatically the parameter settings (pulse intensity, pulse duration, and/or working distance if this can be changed) and apply the corrected parameter settings for subsequent impact(s). For example, it is possible to envisage having the processor means propose to the operator pulse parameters better suited to the actual working distance as evaluated after a calibration impact.

The device 1 of the invention can also enable selecting the frequency at which it carries out impact detection and the various subsequent processing and verification operations. In particular, it is possible to envisage executing a calibration impact after a particular number of impacts carried out blind or after the marker head 11 has been moved a predetermined distance in the (X, Y) plane.

A percussion method of the invention for marking parts is described in detail below.

Said method can preferably be implemented using a marker device as described above. However, it is also possible to envisage applying this method using a device that is significantly different from that described, possibly using alternative means fulfilling equivalent functions.

In the method of the invention, a mobile punch 3 strikes the part 2 in such a manner as to deform it.

According to an important feature of the invention, said method includes an impact detection step (a) in which impact of the punch 3 on the part 2 is detected, and a processing step (b) in which, in conjunction with the step (a), the time between the impact time $t_i$ and a predetermined origin time $t_0$ prior to the impact time $t_i$ is evaluated.

This method preferably includes a step (c) of evaluating the distance traveled by the punch 3 between a first position that it occupies substantially at the impact time $t_i$ and a second position that it occupied at an origin time $t_0$ prior to the time $t_i$ of impact.

To detect the impact, the method of the invention includes a step (d), prior to the impact detection step (a), in which propulsion means 6 are activated in order to move the punch 3.

Said method preferably also includes a step (e) of evaluating the "flight time" Δt between the activation time $t_a$ of said propulsion means 6 and the time at which the punch 3 collides with the part 2.

Thus the origin time $t_0$ can advantageously be set arbitrarily as corresponding to the activation time $t_a$ of the propulsion means 6, the step (b) and the step (e) then being simultaneous or even combined.

The method of the invention can also include a step (f) of using the processor means 5 to establish a correlation between the flight time and the distance traveled by the punch. It is particularly preferable for the step (f) and the step (c) to be combined, the actual working distance being evaluated with the aid of a chart from the known flight time.

The method of the invention can advantageously also include a step (g) of evaluating the kinetic energy of the punch 3 at the moment of impact. To be more precise, the speed of said punch just before it comes into physical contact with the part 2 can be evaluated and, knowing the mass in motion, which mass depends on the masses of the punch 3 and the slug 9, the kinetic energy that can deform the surface of the part 2 at the moment of impact can also be evaluated.

It is particularly preferable for the method of the invention to include a step (h) of comparing one or more values obtained by impact detection, such as the flight time, the distance traveled by the punch 3, or the kinetic energy of the punch at the moment of impact, to corresponding values either from setpoints set by the user or from statistical processing of data obtained beforehand and acquired in impacts carried out previously.

The step (h) can include a processing substep (h') aiming to establish the parameters of the pulse as a function of the mode of operation chosen by the user.

The step (h) can also include a diagnostic substep (h") for verifying that the values obtained by impact detection are coherent and, if appropriate, to warn the user to a malfunction. In particular, in the substep (h"), the user can be warned if there is no detection of actual impact within a predetermined time period starting with activation of the propulsion means 6.

The method of the invention can also include an adjustment step (i) of modifying the marking parameters, in particular the parameters for activation of the propulsion means 6 as a function of the result(s) of the comparison step (h).

It is particularly preferable for the adjustment step (i) to be executed automatically by the processor means 5, which themselves correct the pulse duration and/or intensity setpoint values applicable to the electromagnet 7.

To give a purely illustrative example, if the kinetic energy evaluated after the impact proves insufficient and the working distance is short, the processor means 5 could increase the pulse intensity setpoint value without modifying its duration. Conversely, if the working distance is sufficiently large and the flight time relatively long, the processor means could increase the duration of the pulse without modifying its intensity.

The impact detection step (a) and/or the processing step (b) and/or the steps (c), (e), (f), (g), (h), and (i) are preferably not executed systematically on each impact of the punch on the part, but only on an ad hoc basis, in a specific stage (E) of calibrating the device 1. Said calibration stage (E) preferably alternates with one or more blind marking stages (M) in which the processing step (b) is not executed after impact detection, or even the impact detection step (a) is not executed. The absence of the step (a) or (b) naturally renders superfluous the other steps conditioned by obtaining the result(s) of said steps (a) and (b) during the blind marking stage (M).

In particular this enables changes in the marking process to be monitored periodically by comparing the data measured and evaluated during two successive calibration stages (E).

Impacts effected in a blind marking stage preferably use the parameters applicable to the propulsion means 6 defined in the calibration stage (E) that immediately precedes said blind marking stage (M).

For example, if the processor means 5 find that the working distance increases as marking proceeds, whereas the duration of the exciting pulse is relatively long, such that the stylus acquires greater and greater speed and greater and greater kinetic energy on each impact, the processor means 5 could limit the duration of said pulse to normalize the kinetic energy on subsequent impacts.

The calibration stage (E) preferably includes a substage ($E_1$) in which a calibration impact of the punch 3 on the part 2 is effected, to be more precise by activating the propulsion means 6 under particular conditions that correspond to those of a calibration impact.

As defined above, those particular conditions correspond in particular to specific parameter settings for the excitation pulse for the electromagnet 7.

During the substage ($E_1$), the impact detection step (a) and the processing step (b) are preferably executed during execution of said calibration impact. It is particularly preferable for the substage ($E_1$) to use a sequence combining the steps (d), (a), (b), (e), (f), (g), and (h) executed in that order, the step (d) being executed using the activation parameters corresponding to a calibration impact, i.e. a calibrated pulse.

However, the kinetic energy imparted to the punch 3 in a calibration impact could be significantly different from the kinetic energy needed to obtain markings on the part 2 deemed satisfactory. It is consequently necessary to correct the effects of said calibration impact so that calibration does not disturb the consistency of marking. The parameters of the calibration impact are preferably set to impart a relatively low energy to the punch 3, so that it is possible to make good the marking by striking the part 2 with the punch 3 a second time at substantially the same place in order to increase the depth of the spot initially formed by the calibration impact to a depth identical to that of the adjacent marking spots.

To this end, the calibration stage (E) advantageously includes a substage ($E_2$) during which a compensation impact is effected at substantially the same place as the calibration impact. Thus the depth of the marking resulting from said calibration impact is corrected so that it substantially corresponds to that of the adjacent markings obtained during the blind marking stages (M). Thus it is possible to prevent defects in the visual appearance of the markings caused by calibration of the device 1.

After the stage ($E_2$), the adjustment step (i) can be carried out on the basis of the comparison effected during the step (h) of the stage ($E_1$) immediately preceding the stage ($E_2$), to initialize a new blind marking stage (M) on the basis of corrected parameters.

Producing all the marking points using a combination of calibration impacts and compensation impacts could of course be envisaged. However, given that periodic calibration is generally sufficient to guarantee excellent marking quality, excessive verification representing an increase in time and energy is not necessarily justified.

Figure 6:
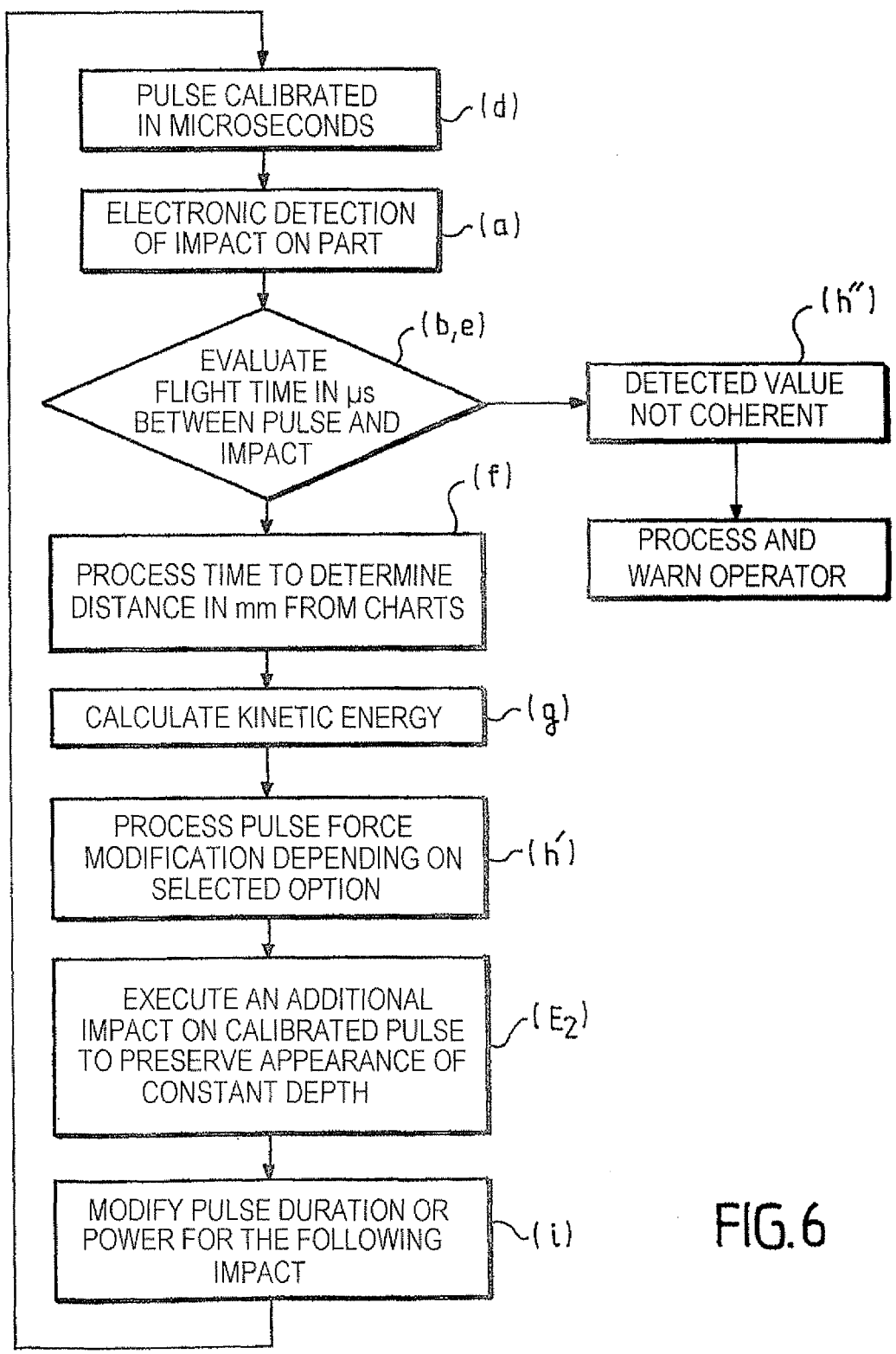
FIG. 6 is a flowchart showing a calibration stage that can be used in a marking method of the invention.

FIG. 6 shows one non-limiting example of a calibration stage (E) of the invention.

To simplify and accelerate impact detection and the resulting data processing, the processor means 5 can advantageously be computerized and employ one or more computer programs for executing the various functions described above.

The present invention therefore also relates to a computer program including computer program code means adapted to execute the steps of a method conforming to that described above when said program is executed on a computer.

The term "computer" means in particular any programmable electronic circuit for controlling, where appropriate remote controlling, the device 1 and the marking process, whether said circuit is integrated into the control unit 14 or constitutes an industrial automatic controller or a PC-type computer.

The present invention naturally encompasses the provision of said computer program on a computer-readable medium, and a computer-readable medium on which said program is stored.

It is particularly advantageous for the percussion marker device 1 of the invention to provide particularly refined management of the marking process and offer the user "intelligent" marking assistance functions.

Verification of the existence of an actual impact of the punch on the part and characterization of the actual behavior of the punch advantageously make the marking process controllable and reliable, guaranteeing its reproducibility and the readability of the impacts at the same time as optimizing the cycle time.

It is particularly advantageous that the information derived from such control through impact detection also makes available to the user diagnostic tools for quickly reporting a malfunction in the marking process. Early diagnosis advantageously limits the number of parts to be reworked or rejected because of defective marking and/or reduces the downtime necessary for maintenance of the marker device or associated production equipment.

SUSCEPTIBILITY OF INDUSTRIAL APPLICATION

The present invention finds its industrial application in the fabrication and use of devices for marking parts.

The invention claimed is:

1. A device (1) for marking parts by percussion comprising: a mobile punch (3) to strike a part (2) to be marked so as to deliberately plastically deform said part (2), an impact detector (4) for detecting impact of the punch (3) on said part (2) to be marked, and a processor (5) functionally connected to the impact detector (4) to evaluate the time between the impact time ($t_i$) and a predetermined origin time ($t_0$) before the impact time ($t_i$), and further comprising a propulsion device (6) adapted, when activated, to cause the punch (3) to move, and wherein the processor (5) is capable of evaluating a flight time ($\Delta t$) between the time of activation of said propulsion device (6) and the time at which the punch (3) collides with the part (2), wherein the propulsion device (6) includes an electromagnet (7) adapted to impart movement to a mobile core (8) drivingly connected to the punch (3), the mobile core (8) and the punch (3) being such that impact of the punch (3) on the part (2) disturbs the movement of the mobile core and this disturbance of the movement of the mobile core generates a back-emf in the electromagnet (7), and wherein the impact detector (4) includes a current measurer (17) that is capable of measuring the electric current flowing the electromagnet (7).

2. A device according to claim 1, wherein the processor is capable of correlating the flight time (Δt) and the distance traveled by the punch (3).

3. A device according to claim 1, wherein the processor (5) includes a filter electronic circuit (20) connected to the current measurer (17) to isolate from the electric current flowing in the electromagnet (7) the disturbance (P) that is caused by the back-emf caused by the impact of the punch on the part.

4. A device according to claim 3, wherein said filter electronic circuit includes a second order filter.

5. A device according to claim 1, further comprising a controller (21) adapted to apply a current pulse to the electromagnet (7), said controller (21) having parameter setting elements for adjusting the intensity and/or the duration of said pulse.

6. A device according to claim 5, wherein the controller (21) is connected to the processor (5) so that the processor can control the electromagnet.

7. A device according to claim 6, wherein the processor (5) includes a trainer that is capable of allowing the user to store one or more adjustments corresponding to a kinetic energy of the punch (3) that imparts a visual appearance of the marking deemed satisfactory, said processor (5) then being able to adjust themselves the parameter setting elements for the excitation pulse of the electromagnet (7) to reproduce that kinetic energy on subsequent impacts.

8. A device according to claim 1, wherein the processor (5) includes a data storage unit (22) enabling said processor (5) to store a record of data it determined, measured, processed and/or transferred at the time of previous impacts.

9. A device according to claim 8, wherein the processor (5) is adapted to apply statistical processing to some or all of the data of the record and is capable of effecting a comparison between said data and data in respect of a new impact in order to warn the user if a significant difference is apparent from said comparison.

10. A device according to claim 1, wherein the processor (5) is adapted to evaluate the kinetic energy of the punch (3) at the time of the impact.

11. A device according to claim 1, wherein the processor (5) is capable of verifying whether an actual impact of the punch (3) on the part (2) is detected in a predetermined time period starting from activation of the propulsion device (6) and to report an anomaly if no impact has been detected at the end of said time period.

12. A device according to claim 1, wherein the punch (3) is mobile in translation along an axis Z in a marker head (11) and the processor (5) can be used to adjust the working distance by controlling the position of the marker head (11) relative to the part (2) along an axis substantially parallel to said axis Z.

13. A method of marking parts by percussion using the device according to claim 1, said method comprising: striking a part (2) to be marked with a said mobile punch (3) in such a manner as to deform the part, and further comprising an impact detection step (a) in which impact of the punch (3) on said part (2) to be marked is detected, and a processing step (b) in which, in connection with the step (a), the time between the impact time ($t_i$) and a predetermined origin time ($t_0$) before the impact time ($t_i$) is evaluated.

14. A method according to claim 13, further comprising a step (c) in which the distance traveled by the punch (3) between a first position that it occupies substantially at the impact time and a second position that it occupied at an origin time before the impact time is evaluated.

15. A method according to claim 13, further comprising a step (d) before the impact detection step (a) in which a propulsion device (6) is activated to cause movement of the punch (3) and a step (e) in which the "flight time" (Δt) between the time of activation of said propulsion device and the time at which the punch collides with the part is evaluated.

16. A method according to claim 15, further comprising a step (f) in which a correlation is established between the "flight time" (Δt) and the distance traveled by the punch (3).

17. A method according claim 13, further comprising a step (g) in which the kinetic energy of the punch (3) at the time of the impact is evaluated.

18. A method according to claim 13, further comprising a specific calibration stage (E) that includes a substage ($E_1$) in which the impact detection step (a) and the processing step (b) are executed during the execution of a calibration impact of the punch (3) on the part (2) and a substage ($E_2$) in which a compensation impact is effected at substantially the same place as the calibration impact in order to correct the depth of the marking resulting from said calibration impact.

19. A device (1) for marking parts by percussion comprising:
a mobile punch (3) adapted to strike a part (2) to be marked so as to deform it, an impact detector (4) capable of detecting impact of the punch (3) on said part (2) to be marked,
a processor (5) functionally connected to the impact detector (4) to evaluate the time between the impact time ($t_i$) and a predetermined origin time ($t_0$) before the impact time ($t_i$), and
a propulsion device (6) adapted, when activated, to cause the punch (3) to move and wherein the processor (5) is capable of evaluating the "flight time" (Δt) between the time of activation of said propulsion device (6) and the time at which the punch (3) collides with the part (2),
wherein the propulsion device (6) include an electromagnet (7) adapted to impart movement to a mobile core (8) drivingly connected to the punch (3), the mobile core (8) and the punch (3) being such that impact of the punch (3) on the part (2) disturbs the movement of the mobile core and this disturbance of the movement of the mobile core generates a back-emf in the electromagnet (7), and
wherein the impact detector (4) includes a current measurer (17) for measuring the electric current flowing in the electromagnet (7).

20. A device according to claim 19, wherein the processor (5) includes a filter electronic circuit (20) connected to the current measurer (17) to isolate from the electric current flowing in the electromagnet (7) the disturbance (P) that is caused by the back-emf caused by the impact of the punch on the part.

21. A device according to claim 20, filter electronic circuit includes a second order filter.

* * * * *